United States Patent
Kitada et al.

(10) Patent No.: US 7,341,053 B2
(45) Date of Patent: Mar. 11, 2008

(54) COMBUSTION CHAMBER STRUCTURE OF AN INTERNAL COMBUSTION ENGINE

(75) Inventors: Daisuke Kitada, Toyota (JP); Toshinobu Natori, Kanagawa (JP); Kunio Hatada, Uji (JP); Haruaki Yoneda, Kyoto (JP); Kenzo Kubo, Kyoto (JP)

(73) Assignees: Mitsubishi Jidosha Kogyo Kabushiki Kaisha, Tokyo (JP); Mitsubishi Jidosha Engineering Kabushiki Kaisha, Okazaki-shi ( * ) Notice: Subject to any disclaimer, the term of this patent is extended or adjusted under 35 U.S.C. 154(b) by 32 days.

(21) Appl. No.: 11/298,685

(22) Filed: Dec. 12, 2005

(65) Prior Publication Data

US 2006/0137666 A1 Jun. 29, 2006

(30) Foreign Application Priority Data

Dec. 27, 2004 (JP) ............................. 2004-376166

(51) Int. Cl.
*F02F 3/28* (2006.01)
*F02B 23/08* (2006.01)

(52) U.S. Cl. ................... 123/661; 123/671; 123/193.3; 123/193.6

(58) Field of Classification Search ................ 123/661, 123/671, 193.6, 193.3
See application file for complete search history.

(56) References Cited

U.S. PATENT DOCUMENTS

| | | | | |
|---|---|---|---|---|
| 5,423,300 A | * | 6/1995 | Ando et al. | 123/432 |
| 5,771,872 A | * | 6/1998 | Ueda et al. | 123/661 |
| 5,934,262 A | * | 8/1999 | Konig | 123/661 |
| 6,138,639 A | * | 10/2000 | Hiraya et al. | 123/295 |
| 6,336,438 B1 | * | 1/2002 | Durnholz et al. | 123/301 |
| 6,401,702 B1 | * | 6/2002 | Konig | 123/661 |
| 6,578,547 B2 | * | 6/2003 | Piock | 123/305 |
| 6,615,789 B2 | * | 9/2003 | Inoue et al. | 123/193.6 |
| 6,672,276 B2 | * | 1/2004 | Hiraya et al. | 123/276 |
| 2003/0127068 A1 | * | 7/2003 | Hiraya et al. | 123/276 |
| 2006/0185642 A1 | * | 8/2006 | Nabetani et al. | 123/279 |

FOREIGN PATENT DOCUMENTS

JP 10-184366 A 7/1998

* cited by examiner

*Primary Examiner*—Stephen K. Cronin
*Assistant Examiner*—Ka Chun Leung
(74) *Attorney, Agent, or Firm*—Birch, Stewart, Kolasch & Birch, LLP

(57) ABSTRACT

A squish surface having the shape of a plane surface orthogonal to the axis of a piston is formed on the intake side of the piston top surface. A squish area is formed between the squish surface and a plane surface-shaped squish surface on the cylinder head side, and at the same time, a squish guide surface is formed in the piston top surface so as to be continuously ridged from the squish surface toward the vicinity of a spark plug.

8 Claims, 2 Drawing Sheets

COMBUSTION CHAMBER STRUCTURE OF AN INTERNAL COMBUSTION ENGINE

BACKGROUND OF THE INVENTION

1. Field of the Invention

The present invention relates to a combustion chamber structure of a spark ignition-type internal combustion engine.

2. Description of the Related Art

A combustion chamber structure of an internal combustion engine, in which a squish area is created between a piston top surface and the lower surface of a cylinder head forming the combustion chamber, and a squish flow is generated in the intake air (air or air-fuel mixture) existing in the squish area at around the compression top dead center of the piston to promote combustion, has been employed. The squish flow functions not only to stir the intake air but also to transfer the intake air toward a spark plug disposed close to the center of the combustion chamber. As the squish flow contains a lot of downward components with respect to a squish surface, however, when the squish surface is formed in a horizontal position (that is, orthogonal to the axis of the piston), it is unlikely that the squish flow is sufficiently transferred toward the spark plug that is positioned slightly above the squish surface in the combustion chamber.

In consideration of the above-mentioned circumstances, a combustion chamber structure designed to produce a squish flow in an obliquely upward direction has been suggested, for example, in Unexamined Japanese Patent Publication 10-184366 (hereinafter referred to as Patent Document 1). In the combustion chamber structure disclosed in Patent Document 1, there is formed a conical squish surface in the rim of a piston top surface, and a squish flow is created to be sent to the spark plug in between the squish surface and the lower surface of a cylinder head forming a pent roof-shaped combustion chamber from the rim side of the combustion chamber toward the center of the combustion chamber when viewed in plan view and obliquely upward when viewed in side view.

In this combustion chamber structure, the squish surface on the piston side has a conical shape, while the lower surface of the cylinder head is made up mainly of two plane surfaces inclined to the intake side and the exhaust side in order to form the pent roof-shaped combustion chamber. Therefore, it is only a very small region where a space suitable for the generation of a squish flow at around the compression top dead center of the piston is formed. If apart from the region slightly in the circumferential direction, the space is enlarged and does not contribute to the generation of the squish flow. For this reason, it is impossible to produce a strong squish flow, so that the transfer of the squish flow to the spark plug is consequently insufficient. It is then hard to say that the above combustion chamber structure is a credible improvement.

SUMMARY OF THE INVENTION

An aspect of the present invention is a combustion chamber structure of an internal combustion engine comprising a plane surface portion formed in at least either one of a region stretching from an intake-side edge of a top surface of a piston to the vicinity of a position corresponding to an intake port and a region stretching from an exhaust-side edge of the top surface of the piston to the vicinity of a position corresponding to an exhaust port so as to be orthogonal to an axis of the piston, the plane surface portion forming a squish area in consort with a flat portion formed in a lower surface of a cylinder head at around the compression top dead center of the piston so as to sandwich the squish area therebetween; a conical tapered portion formed in a rim of the top surface of the piston except for the plane surface portion; a ridge portion that is continuously ridged from the plane surface portion toward the vicinity of a spark plug disposed in a combustion chamber; and a recessed portion formed to be surrounded by the tapered portion and the ridge portion.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

A combustion chamber structure of an inlet port injection-type internal combustion engine according to one embodiment of the present invention will be described below.

Figure 1:
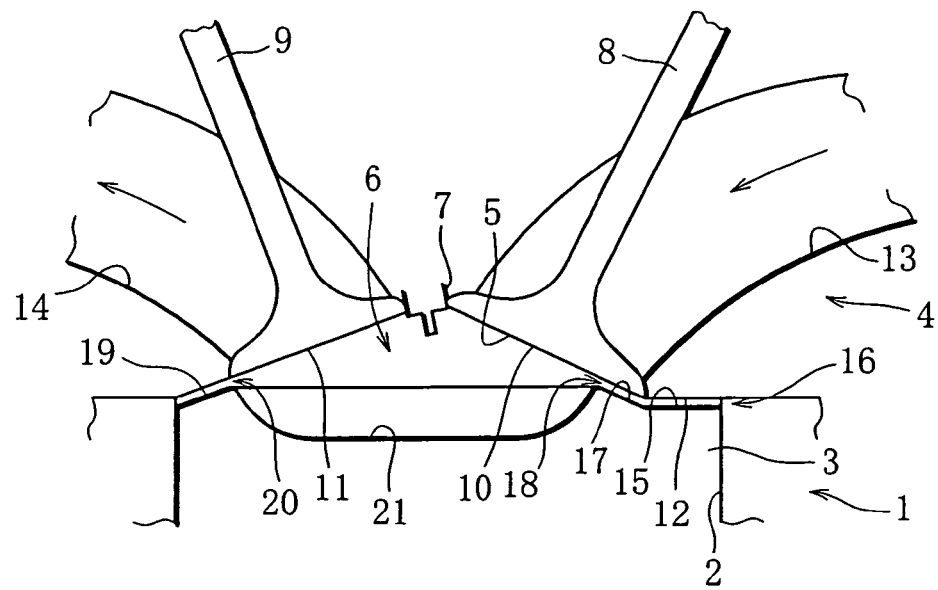
FIG. 1 is a sectional side view showing a combustion chamber structure of an internal combustion engine according to one embodiment of the present invention.
Figure 2:
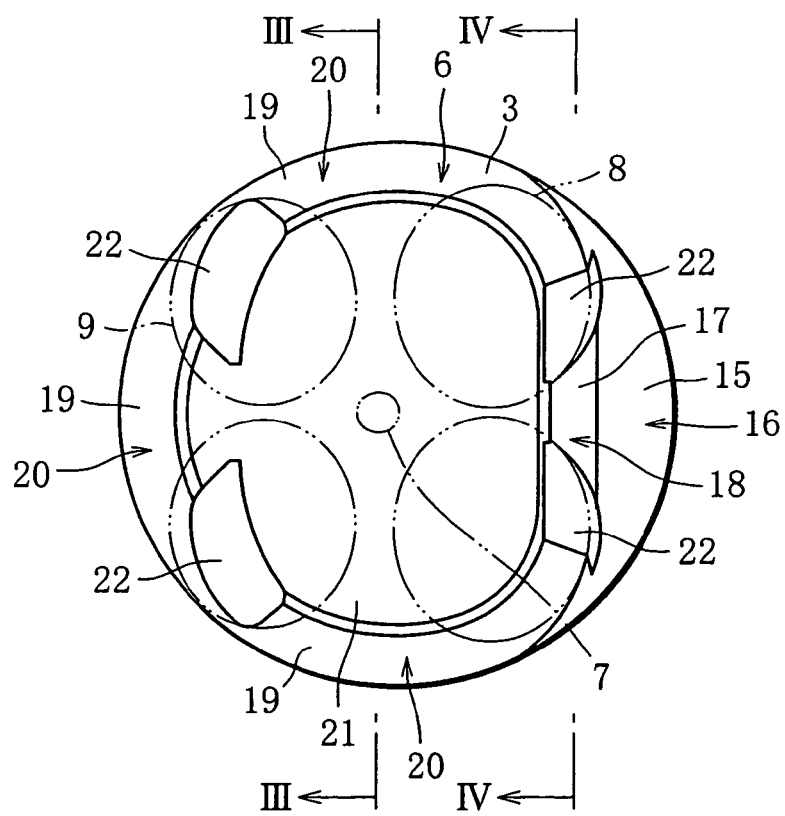
FIG. 2 is a sectional plan view showing the combustion chamber structure of FIG. 1.
Figure 3:
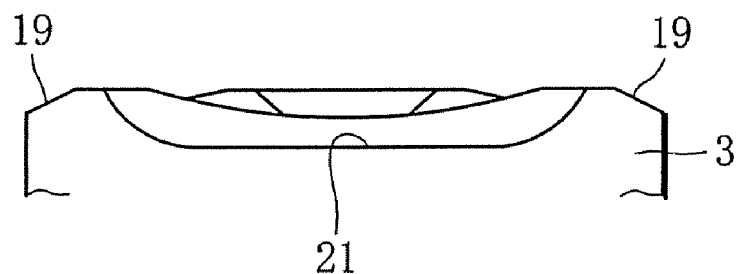
FIG. 3 is a sectional side view showing a cavity of a piston top surface, taken along line III-III of FIG. 2.
Figure 4:
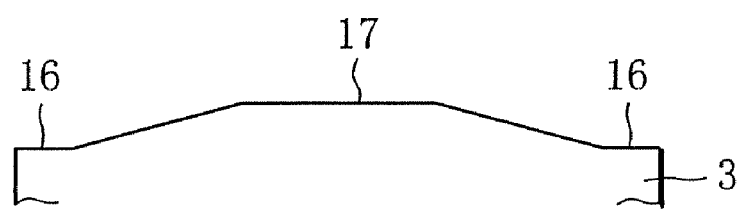
FIG. 4 is a sectional side view showing a squish guide surface of the piston top surface, taken along line IV-IV of FIG. 2.

FIG. 1 is a sectional side view showing the combustion chamber structure of an internal combustion engine according to the embodiment. FIG. 2 is a sectional plan view also showing the combustion chamber structure. FIG. 3 is a sectional side view showing a cavity of a piston top surface, taken along line III-III of FIG. 2. Although these drawings show a section of one cylinder of the internal combustion engine, other cylinders each have an identical sectional shape.

Referring to FIG. 1, a piston 3 is disposed in a cylinder 2 formed in a cylinder block 1 of the internal combustion engine to be slidable upward and downward. A recessed portion 5 is formed in a lower surface of a cylinder head 4 fixed onto the cylinder block 1 correspondingly to the piston 3. A combustion chamber 6 is constructed from the recessed portion 5 and the top surface of the piston 3. When viewed in the plan view of FIG. 2, a spark plug 7 is disposed at a substantially center of the combustion chamber 6. A pair of intake valves 8 is disposed on the right side (hereinafter referred to as an intake side) of the combustion chamber 6, and a pair of exhaust valves 9 is arranged on the left side (hereinafter referred to as an exhaust side) of the combustion chamber 6, with the spark plug 7 positioned at the center. When viewed in the side view of FIG. 1, the intake valves 8 are inclined rightward, whereas the exhaust valves 9 leftward. There is formed a given included angle between the intake and exhaust valves 8 and 9.

The recessed portion 5 of the lower surface of the cylinder head 4 has two plane surfaces inclined in opposite directions toward the intake and exhaust sides along valve heads of the intake and exhaust valves 8 and 9, which gives the combustion chamber 6 a pent-roof shape. Hereinafter, the two plane surfaces of the recessed portion 5 will be referred to as an intake-side inclined surface 10 and an exhaust-side inclined surface 11. The spark plug 7 is located on a ridgeline where both the inclined surfaces 10 and 11 meet each other. The exhaust-side inclined surface 11 is formed to expand to an exhaust-side rim in the cylinder 2, while the intake-side inclined surface 10 has a dead end near a lowermost end of the valve head of the intake valve 8. Formed in a region stretching from the dead end to an intake-side rim of the cylinder 2 is a horizontal squish surface 12 (flat portion) orthogonal to the axis of the piston 3. The squish surface 12 is designed to be in plane with the lower surface of the cylinder head that is in contact with an upper surface of the cylinder block.

Disposed on the cylinder head 4 is a valve gear, not shown. During engine operation, the intake and exhaust valves 8 and 9 are activated with given timing synchronized with rotation of a crankshaft (namely, up and down movement of the piston 3) by a camshaft of the valve gear so that the intake valve 8 opens/closes an intake port 13, and the exhaust valve 9 opens/closes an exhaust port 14.

When viewed in the side view of FIG. 1, formed on the intake side of the piston top surface is a squish surface 15 (plane surface portion) having the shape of a horizontal plane surface orthogonal to the axis of the piston 3. The squish surface 15 corresponds to the squish surface 12 on the cylinder head side. When the piston 3 is at the compression top dead center, the squish surface 15 faces the squish surface 12 on the cylinder head side with a given space interposed therebetween while maintained in a position parallel to the squish surface 12. Hereinafter, the space will be referred to as a squish area 16. Since the squish surface 15 on the piston side and the squish surface 12 on the cylinder head side are both plane surfaces, the squish area 16 consisting of a wide region is formed between the squish surfaces 12 and 15 as illustrated in FIG. 2.

The squish surface 15 of the piston 3 will be described in detail. The squish surface 15 is formed in a region stretching from the vicinity of the lowermost end of the valve head of the intake valve 8 to the intake-side rim of the piston top surface. The squish surface 15 is virtually level with the lowermost end of the valve head of the intake valve 8. When viewed in the plane view of FIG. 2, the squish surface 15 as a whole has a substantially crescent shape along the intake-side rim of the piston top surface.

Formed on the exhaust side of the squish surface 15 of the piston top surface is a squish guide surface 17 (ridge portion). When viewed in the plan view of FIG. 2, the squish guide surface 17 is formed into a plane surface expanding from one of the intake valves 8 side to the other intake valve 8 side in the piston surface along the substantially crescent-shaped squish surface 15. When viewed in the side view of FIG. 1, the squish guide surface 17 has a sectional shape that is continuously and linearly ridged from the level of the squish surface 15 toward the center of the combustion chamber (that is, toward the spark plug 7 when the piston 3 is at around the compression top dead center).

Although not shown in FIG. 1 that is the sectional view cutting through the intake valve 8, when the piston 3 is at the compression top dead center, the squish guide surface 17 faces the intake-side inclined surface 10 of the combustion chamber 6 with a given space interposed therebetween while maintained in a position parallel to the intake-side inclined surface 10. Hereinafter, the space will be referred to as a guide area 18. The guide area 18 continues to the squish area 16.

A tapered portion 19 is formed in a conical shape in the entire rim of the piston top surface, except for the squish surface 15. The tapered portion 19 has a sectional shape that is linearly ridged toward the center of the combustion chamber in the same manner as the squish guide surface 17. Ends of the tapered portion 19 are connected to the respective ends of the squish guide surface 17. This results in a layout in which the squish guide surface 17 and the tapered portion 19 continue to each other in a circle on the piston top surface, and the squish surface 15 is positioned along the intake side thereof.

The tapered portion 19 serves as a squish surface and forms a given squish area 20 in consort with the rim of the recessed portion 5 of the lower surface of the cylinder head so as to sandwich the squish area 20 therebetween when the piston 3 is at around the compression top dead center. Although FIG. 1 only shows the squish area 20 formed between the tapered portion 19 and the exhaust-side inclined surface 11, similar squish areas 20 are also formed in other places.

A region of the piston top surface, which is surrounded by the squish guide surface 17 and the tapered portion 19, is formed into a gentle concave, to thereby form a cavity 21 (recessed portion) in the piston top surface. The cavity 21 is not in the shape of a shallow dish aimed at a compression ratio adjustment, but it is relatively deep enough to contribute to the transfer of intake air in the combustion chamber 6 as mentioned below. Since the piston top surface is raised because of the squish guide surface 17 and the tapered portion 19, even such deep cavity 21 can be formed without difficulty.

Reference numeral 22 denotes valve recesses formed in the piston top surface in order to avoid interference with the intake and exhaust valves 8 and 9.

As stated above, the squish surface 15 of the piston top surface is provided onto the farside of the intake valves 8 as viewed from the exhaust valves 9. Therefore, a dimension of the squish surface 15 in a horizontal direction (piston-radial direction) of FIG. 2 is restricted by the intake valves 8. As is apparent from FIG. 2, however, the intake valves 8, the spark plug 7, and the exhaust valves 9 are offset on the exhaust side while keeping mutual positional relationship, so that there is sufficiently secured the dimension of the squish surface 15 in the horizontal direction of FIG. 2, that is to say, the area of the squish area 16. As a result of the offset, the intake valves 8 having a larger diameter than the exhaust valves 9 move toward the center of the cylinder, which is comparatively spacious. This makes it possible to set desired diameters of the intake valves without being restricted by the cylinder 2 and to set dimensions and positional relationship of components disposed in the periphery of the combustion chamber in a balanced manner as a whole.

The transfer of intake air and the generation of the squish flow that are achieved by the combustion chamber structure of an internal combustion engine constructed as described above will be explained in detail.

During the drive of the internal combustion engine, fuel is sprayed from a fuel injection valve, not shown, into the intake air flowing through an intake-air path of the engine, so that the intake air as air-fuel mixture reaches the intake port 13. When the engine is brought into an intake stroke, and the camshaft of the valve gear opens the intake valves 8, the intake air of the intake port 13 is directed into the combustion chamber 6 along with a fall of the piston 3. A mainstream of the intake air directed into the combustion chamber 6 is reversed upward to be given a vector acting in a rotating direction at an initial stage of the intake stroke while being guided along the shape of the cavity of the piston top surface. The given vector lasts into the last half of the intake stroke, which causes a high intake inertia effect and drastically increases a fill amount of intake air guided into the combustion chamber 6.

When the internal combustion engine is transited from the intake stroke to a compression stroke, and the piston 3 rises as shown in FIG. 1 to reach just before the compression top dead center, the squish surface 15 on the piston side and the squish surface 12 on the cylinder head side get closer to each other to narrow the squish area 16, resulting in the generation of a squish flow from the intake air existing in the squish area 16. At this point, since the large squish area 16 is formed of the squish surfaces 12 and 15 each having the shape of a plane surface, the large squish area 16 encourages the generation of the squish flow, and therefore the created squish flow is still stronger, compared to for example the technology disclosed in Patent Document 1 in which there is provided a conical squish surface on a piston side.

Since the rim of the piston 3 side of the squish area 16 is blocked by the cylinder 2, the squish flow is produced toward the center of the combustion chamber. The produced squish flow is changed in its transfer course, because of the squish guide surface 17 that is continuously ridged from the squish surface 15 of the piston top surface, so as to advance obliquely upward, that is, in a direction moving toward the spark plug 7 positioned at the substantially center of the combustion chamber 6, and is guided by the guide area 18 to reach the vicinity of the spark plug.

In the above-mentioned manner, the produced squish flow can be reliably transferred to the vicinity of the spark plug, so that it is possible to satisfactorily provide the combustion-promoting action exerted by the squish flow. Consequently, in combination with the increase of a flow rate of intake air, which is caused by the intake inertia effect, it is possible to obtain various advantages including augmentation of engine power, improvement of fuel consumption, improvement of exhaust gas performance, and the like.

It is necessary to form the valve recesses 22 in the piston top surface in order to avoid interference with the intake and exhaust valves 8 and 9, especially with the intake valves 8 having large diameters. For example, in case that the piston top surface is raised by making the conical squish surface in the same manner as the technology disclosed in Patent Document 1, the valve recesses 22 have to be considerably deep for avoiding the interference with the intake valves 8. This leads to an undesirable significant phenomenon that the deeper the valve recesses 22 are, the larger the surface area of the combustion chamber 6 becomes, and that the valve recesses 22 hinder the intake air flow. In the present embodiment, however, the region stretching from the vicinity of the lowermost end of the valve head of the intake valve 8 (or an end of the valve recess 22) to the intake-side rim of the piston top surface serves as the squish surface 15 formed into a plane surface. Accordingly, there is the advantage that the valve recesses 22 for avoiding the interference with the intake valves 8 do not have to be formed so deep, and that a reduction in combustion efficiency attributable to the above phenomena can be prevented.

Although the description of the embodiment is finished here, aspects of the present invention are not confined to this embodiment. For example, the above-described embodiment is materialized as a combustion chamber structure of an inlet port injection-type internal combustion engine, but the type of the engine is not confined to this. The embodiment may be materialized as a combustion chamber structure, for example, of an in-cylinder injection-type internal combustion engine.

According to the embodiment, the squish surfaces 12 and 15 and the squish guide surface 17 are provided on the intake side within the combustion chamber 6 to carry out the generation and guide of the squish. However, the squish surfaces 12 and 15 and the squish guide surface 17 may be provided on the exhaust side, to thereby create a squish flow on the exhaust side and transfer the squish flow to the spark plug 7.

Figure 5:
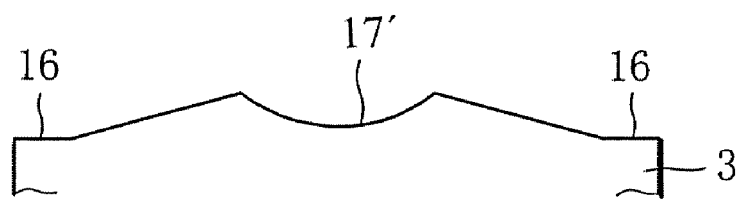
FIG. 5 is a sectional side view showing another example of the squish guide surface of the piston top surface, taken along line IV-IV of FIG. 2.

Furthermore, in the embodiment, the squish guide surface 17 is formed into a plane surface. As shown for example in FIG. 5, however, a squish guide surface 17' may have a concave section in a direction orthogonal to the direction moving toward the spark plug and to the piston axis respectively, that is to say, orthogonal to a horizontal direction of FIG. 2. With such a structure, the squish flow runs along the concave of the squish guide surface 17', which makes it possible to transfer a stronger squish flow to the vicinity of the spark plug.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combustion chamber structure of an internal combustion engine comprising:
    a plane surface portion formed in at least either one of a region stretching from an intake-side edge of a top surface of a piston to the vicinity of a position corresponding to an intake port and a region stretching from an exhaust-side edge of said top surface of the piston to the vicinity of a position corresponding to an exhaust port so as to be orthogonal to an axis of the piston, said plane surface portion forming a squish area in consort with a flat portion formed in a lower surface of a cylinder head at around the compression top dead center of said piston so as to sandwich said squish area therebetween;
    a conical tapered portion formed in a rim of said top surface of the piston except for said plane surface portion, the conical tapered portion extending to an outer peripheral edge of the top surface of the piston;
    a ridge portion that is continuously ridged from said plane surface portion toward the vicinity of a spark plug disposed in a combustion chamber; and
    a recessed portion formed to be surrounded by said tapered portion and said ridge portion.

2. The combustion chamber structure of an internal combustion engine according to claim 1, wherein:
    a squish area is formed between said tapered portion of said top surface of the piston and a lower surface of said cylinder head.

3. The combustion chamber structure of an internal combustion engine according to claim 1, further comprising:
    a valve recess formed in said top surface of the piston in order to avoid interference with an intake valve, wherein:
    said plane surface portion is formed in a region stretching from the intake-side edge of said top surface of the piston to said valve recess.

4. The combustion chamber structure of an internal combustion engine according to claim 1, further comprising:
a valve recess formed in said top surface of the piston in order to avoid interference with an exhaust valve, wherein:
said plane surface portion is formed in a region stretching from the exhaust-side edge of said top surface of the piston to said valve recess.

5. The combustion chamber structure of an internal combustion engine according to claim 1, wherein:
an intake valve, an exhaust valve, and said spark plug are offset toward either one of an intake-side region and an exhaust-side region of said top surface of the piston, in which said plane surface portion is not formed.

6. A combustion chamber structure of an internal combustion engine, comprising:
a plane surface portion formed only in a region stretching from an intake-side edge of a top surface of a piston to the vicinity of a position corresponding to an intake port so as to be orthogonal to an axis of the piston, said plane surface portion forming a squish area in consort with a flat portion formed in a lower surface of a cylinder head at around the compression top dead center of said piston so as to sandwich said squish area therebetween;
a conical tapered portion formed in a rim of said top surface of the piston except for said plane surface portion;
a ridge portion that is continuously ridged from said plane surface portion toward the vicinity of a spark plug disposed in a combustion chamber; and
a recessed portion formed to be surrounded by said tapered portion and said ridge portion,
wherein: the lower surface of said cylinder head is formed in the shape of a pent roof, said spark plug is disposed on a ridgeline where two inclined surfaces forming the pent roof meet each other, and one of said inclined surfaces is opposed to said ridge portion of said top surface of the piston with a given space interposed therebetween when said piston is positioned at around the compression top dead center.

7. The combustion chamber structure of an internal combustion engine according to claim 1, wherein:
the lower surface of said cylinder head is formed in the shape of a pent roof, said spark plug is disposed on a ridgeline where two inclined surfaces forming the pent roof meet each other, and one of said inclined surfaces is opposed to said ridge portion of said top surface of the piston with a given space interposed therebetween when said piston is positioned at around the compression top dead center.

8. A combustion chamber structure of an internal combustion engine, comprising;
a plane surface portion formed in at least either one of a region stretching from an intake-side edge of a top surface of a piston to the vicinity of a position corresponding to an intake port and a region stretching from an exhaust-side edge of said top surface of the piston to the vicinity of a position corresponding to an exhaust port so as to be orthogonal to an axis of the piston, said plane surface portion forming a squish area in consort with a flat portion formed in a lower surface of a cylinder head at around the compression top dead center of said piston so as to sandwich said squish area therebetween;
a conical tapered portion formed in a rim of said top surface of the piston except for said plane surface portion;
a ridge portion that is continuously ridged from said plane surface portion toward the vicinity of a spark plug disposed in a combustion chamber; and
a recessed portion formed to be surrounded by said tapered portion and said ridge portion,
wherein:
said ridge portion has an upper surface a central portion of which is hollowed in a direction orthogonal to a direction moving toward the spark plug and to the piston axis respectively.

* * * * *